Aug. 9, 1966 J. W. JACOBS 3,265,784
METHOD FOR THE MANUFACTURE OF A FOAM INSULATED CABINET
WHEREIN THE CABINET IS COOLED DURING THE
MOLDING TO PREVENT BULGING
Filed April 2, 1963 3 Sheets-Sheet 1

INVENTOR.
James W. Jacobs
BY
Carl A. Stickel
HIS ATTORNEY

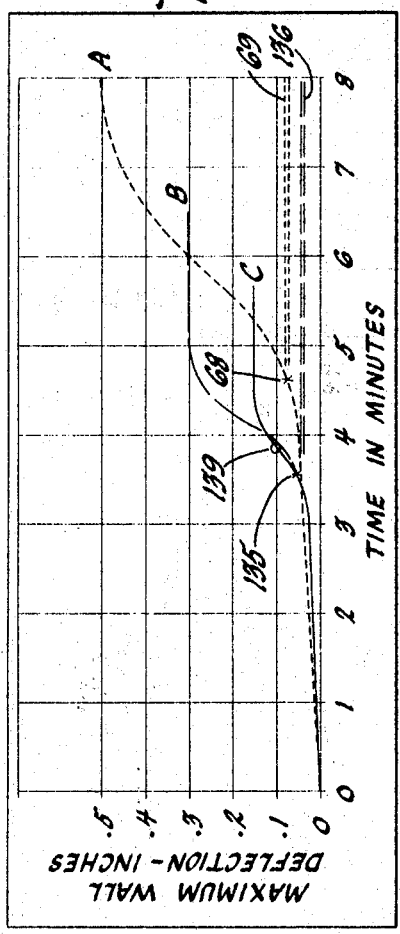
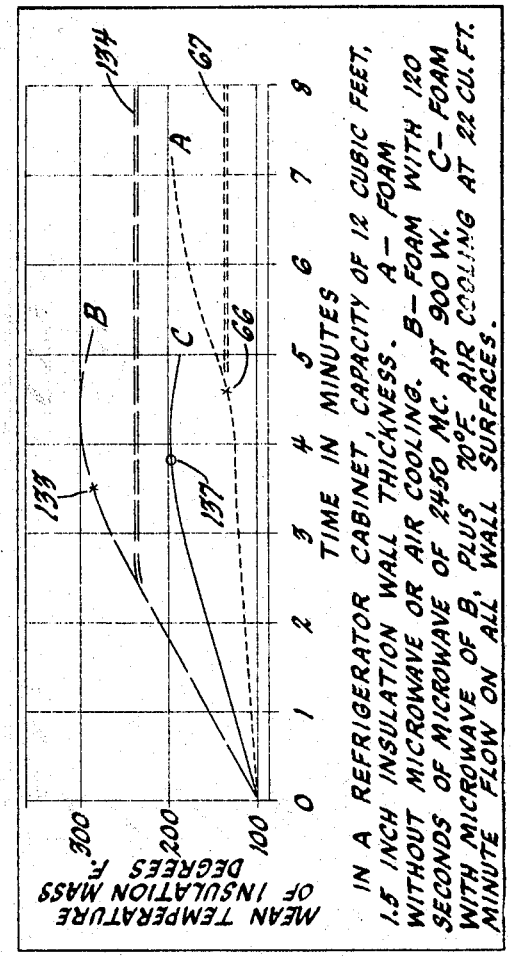
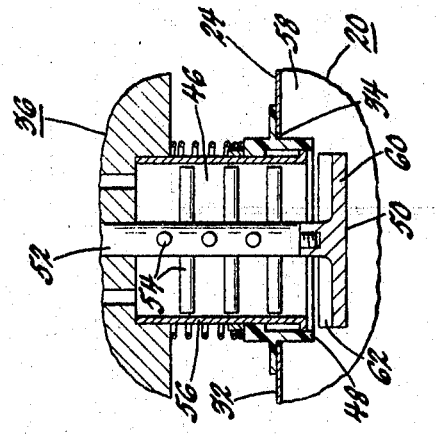

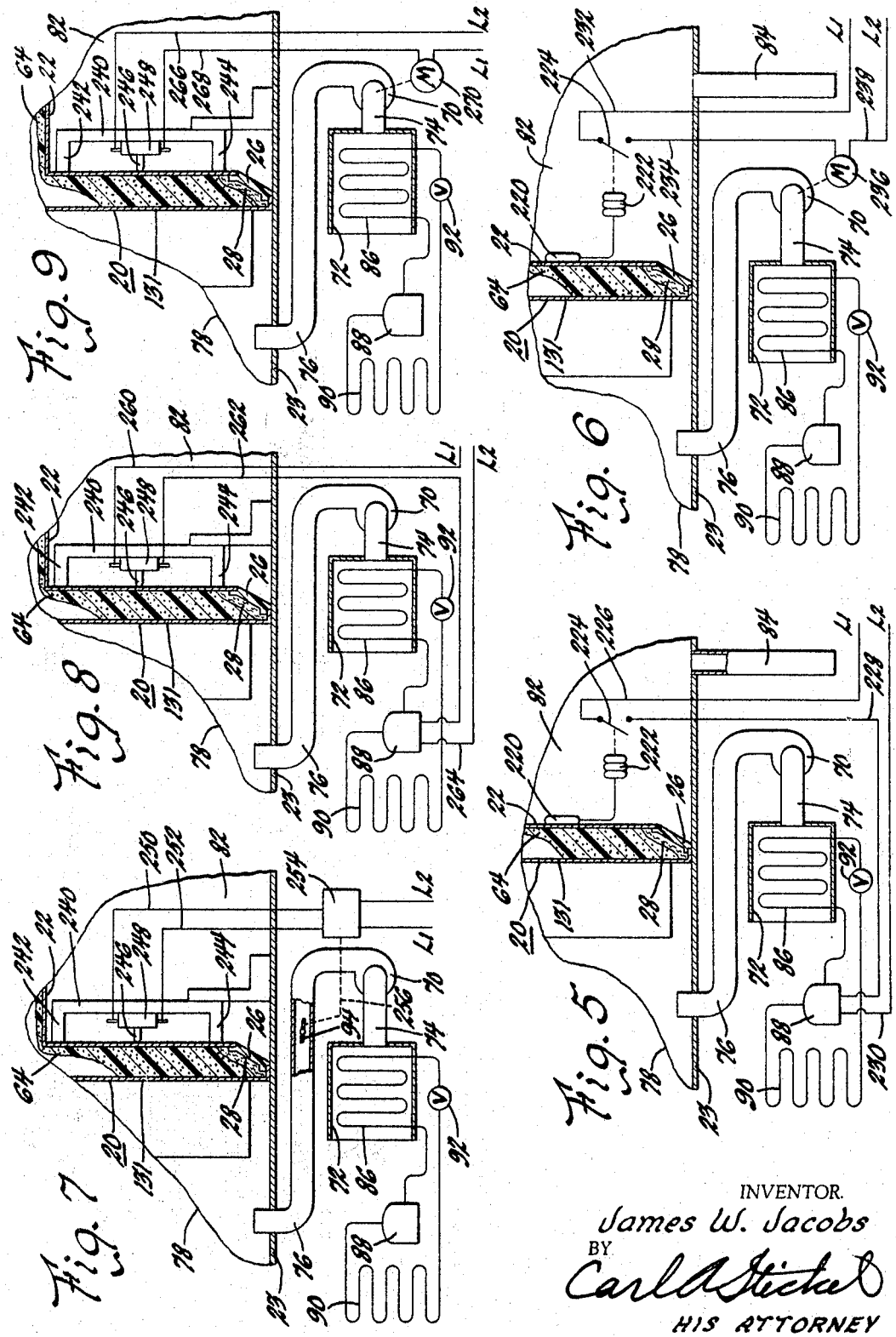

3,265,784
Patented August 9, 1966

1

3,265,784
METHOD FOR THE MANUFACTURE OF A FOAM INSULATED CABINET WHEREIN THE CABINET IS COOLED DURING THE MOLDING TO PREVENT BULGING
James W. Jacobs, Dayton, Ohio, assignor to General Motors Corporation, Detroit, Mich., a corporation of Delaware
Filed Apr. 2, 1963, Ser. No. 269,977
4 Claims. (Cl. 264—45)

This invention pertains to a method of manufacture and more particularly to means for preventing bulging of the walls of a space to be filled with foam material.

It has been recognized that lightweight plastic foam materials are excellent for filling spaces in walls. When they contain an insulating gas, it has been recognized that they have excellent insulating properties. The most economical construction is obtained when the foam-forming material is cast between thin sheet metal walls. It has been found that these materials, as the foaming takes place, exert sufficiently high pressure upon the thin walls to cause them to bulge. It has been customary to prevent such bulging by the use of thick molds. This considerably increases the cost of manufacture and has limited the use of plastic foam material in many possible applications.

It has also been proposed that the foaming be stimulated and made more uniform by the application of microwave energy to the space to be filled. This provides more rapid foaming. The use of microwave energy has reduced the bulging of the walls but has not eliminated the high expansion pressures and the necessity for the thick molds.

It is an object of this invention to control the temperature of foam-forming materials in such a way that the expansion pressures upon the enclosing walls and the bulging thereof are kept at a minimum without the use of any molds.

It is another object of this invention following the introduction of foam-forming materials into the space between the walls of a spaced wall structure to cool the walls at such a rate that the expansion pressures are kept at a minimum consistent with good distribution.

It is another object, as the exothermic foam-forming materials within a space foam sufficiently to substantially fill the space, to cool the materials at such a rate as to maintain a substantially constant upper temperature limit.

These and other objects are attained in the forms shown in the drawings in which the foam-forming materials and microwave energy are simultaneously introduced into the insulation space between the inner and outer walls. The supply of foam-forming materials is stopped when sufficient material has been supplied to fill the space. The microwave energy also is stopped when the foam-forming material has substantially filled the insulation space between the walls. To prevent the subsequent bulging of the walls, I circulate cool air rapidly in contact with the inner and outer walls, preferably beginning when the microwave energy is stopped or when the insulation space is substantially filled with foam-forming material. A thermostatic control responsive to the wall temperature may be provided for controlling the cooling air to maintain the walls at a substantially constant temperature during this period. As an alternative, the forced circulation or the cooling of the air may start when the walls show the first sign or tendency to bulge. However, if desired, the walls may be contacted by cool air for an extended period including the filling of the insulation space with foam-forming materials and the subsequent solidification and curing of these materials.

Further objects and advantages of the present invention will be apparent from the following description, reference being had to the accompanying drawings wherein preferred embodiments of the present invention are clearly shown.

In the drawings:

FIGURE 2 is a fragmentary view showing the centrifugal foam flinger for the foam supplying apparatus shown in FIGURE 1;

FIGURE 3 is a temperature-time graph of the foam-forming material in a cabinet similar to that shown in FIGURE 1 showing the effect of microwave energy and the air cooling;

FIGURE 4 is a deflection-time graph showing the effect of microwave energy and forced air cooling;

FIGURE 5 is a fragmentary sectional view of the air cooling apparatus similar to FIGURE 1 but showing the cooling of the cooling air controlled by the temperature of one of the walls of the cabinet;

FIGURE 6 is a modified fragmentary sectional view showing the starting of the circulation of cooling air in accordance with the temperature of a wall of a refrigerator cabinet as the insulation space thereof is supplied with foam-forming materials;

FIGURE 7 is a modified fragmentary sectional view showing the control of the circulation of cooling air in accordance with the initial deflection of a wall of a refrigerator cabinet as the insulation space is supplied with foam-forming materials;

Figure 1:
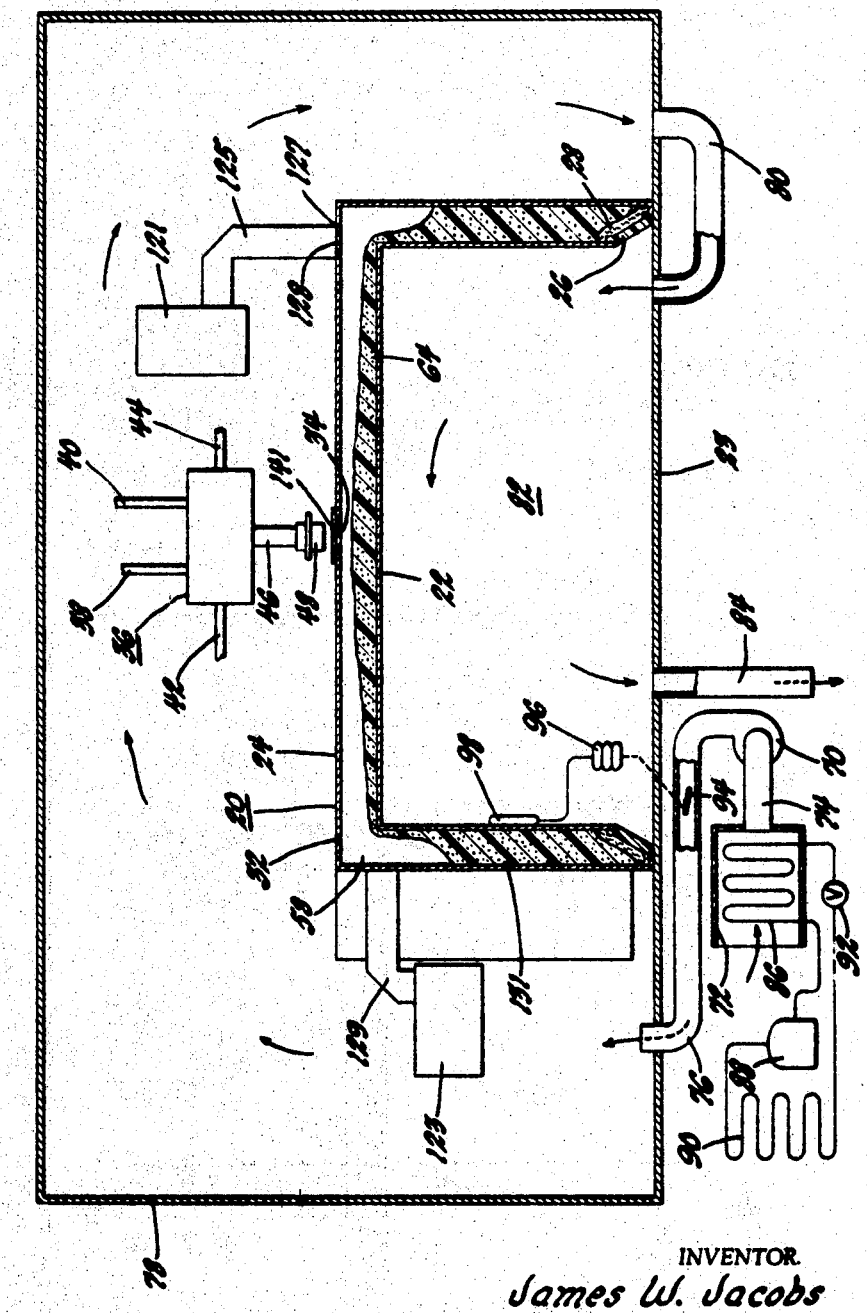
FIGURE 1 is a diagrammatic vertical sectional view through a refrigerator cabinet having its open side face down upon a support together with foam supplying apparatus, microwave supply apparatus and air cooling apparatus for the walls of the cabinet.

FIGURE 8 is a modified fragmentary sectional view showing the control of the cooling of the cooling air in accordance with the initial deflection of a wall of a refrigerator cabinet as the insulation space thereof is supplied with foam-forming materials; and FIGURE 9 is a modified fragmentary sectional view showing the starting of the circulation of the cooling air in accordance with the initial deflection of a wall of a refrigerator as the insulation space thereof is supplied with foam-forming materials.

Referring now to the drawings and more particularly to FIGURE 1, there is shown a refrigerator cabinet 20 provided with thin sheet metal inner walls 22 and thin sheet metal outer walls 24 which are joined by a breaker strip 26 of a suitable plastic material adjacent the door opening or open side of the cabinet. Inside the breaker strip, there is provided a layer of glass fibers 28 which may be used to receive refrigerant conduits and electric wiring. The cabinet is placed with its open side facing downwardly and resting upon a floor 23. The rear wall 32 of the cabinet is provided with a substantially centrally located opening 34 for the introduction of foam-forming material. For this purpose, there is provided a foam-mixing apparatus 36 having supply conduits 38 and 40 for the two components and return conduits 42 and 44 for returning the components in a circulating system. The mixing apparatus is provided with suitable valves and controls for discharging in the proper proportions the two components into a mixing chamber 46 having its outlet 48 provided with a motor-driven flinger 50 (FIGURE 2) provided at the lower end of the mixer shaft 52 having thereon projecting pins 54 within the mixing chamber 46. The outlet 48 is made retractable upon the sleeve 56 which encloses the mixing chamber 46 so that the centrifugal flinger 50 can be projected through the opening 34 into the insulation space 58 to centrifugally distribute the foam-forming material issuing from the mixing chamber 46 during normal operation of the mixer 36. The flinger 50 is in the form of a disk 60 having vertical radial blades 62 extending upwardly therefrom for centrifugally flinging the foam-forming material 64 to all parts of the insulation space 58. After sufficient foam-forming material has been introduced through the opening 34 into the insulation space 58, the opening 34 is closed by the metal cover 141.

Referring now more particularly to FIGURES 3 and 4, there are shown the two curves represented by a dotted line A. The temperature (FIGURE 3) rises relatively slowly until the foam-forming material 64 has expanded sufficiently to substantially fill the insulation space 58. The point 66 on the curve A indicates the point at which the insulation space is substantially filled with the foamed material. The dotted line A in FIGURE 4 indicates the deflection of the cabinet wall during the introduction and expansion and the period following the filling of the cabinet with the foamed material. In FIGURE 4, the point on the dotted line A corresponding to the time when the cabinet is substantially completely filled is designated by the reference character 68. It will be seen that the deflection is relatively small until the cabinet becomes completely filled with the foam material. The most objectionable expansion and deflection of a wall occurs after the insulation space has been substantially completely filled with the foam material. This expansion is accompanied by a substantial increase in temperature from the point 66 to the end of the dotted line.

This expansion results primarily from the rise in temperature of the foam material 64 after the insulation space 58 has been substantially completely filled. According to my invention, I provide an apparatus for keeping the temperature of the foam-forming materials and the wall surfaces substantially constant after the temperature at the point 66 is reached. For this purpose, I provide a motor-driven centrifugal fan 70 which draws in air through the ducts 72 and 74 and discharges the air through a duct 76 into an enclosure 78 which surrounds the cabinet 20 and the foam supply apparatus 36. The enclosure 78 is provided with a duct 80 which conducts the air flowing around the outer walls of the cabinet 20 into the food storage space 82 enclosed within the inner walls 22 of the cabinet 20. The floor 23 is provided with an outlet duct 84 to insure good circulation through the interior 82 of the cabinet. The entrance duct 72 is provided with a refrigerant evaporator 86 which cools the air prior to its entrance into the enclosure 78. The evaporated refrigerant is withdrawn from the evaporator 86 by a sealed motor-compressor unit 88 which discharges the compressed refrigerant into a condenser 90 from which the liquid refrigerant flows through an expansion valve 92 back into the evaporator 86. This assures a supply of cold air for cooling purposes.

The duct 76 is provided with a butterfly damper 94 which is operatively connected to a bellows type fluid motor 96 which in turn is controlled by a thermosensitive bulb 98 mounted in direct contact with the inner wall 22 of the refrigerator cabinet 20. Preferably, this control system 94, 96, 98 is set so that it is fully open at the temperature indicated by the point 66 in FIGURE 3, namely, approximately 135° F. With this arrangement, the duct 76 supplies sufficient air circulation through the enclosure 78 and the storage space 82 of the cabinet 20 to maintain the temperature substantially constant after it rises to the temperature indicated by the point 66. This arrangement therefore eliminates the temperature rise after the point 66 is reached so that a substantially straight horizontal line 67 follows the point 66 instead of the rise in temperature to the letter A. The maintenance of a substantially constant temperature after the point 66 substantially eliminates the expansion and deflection, as indicated by the horizontal line 69 in FIGURE 4, after the point 68 is reached. This is assured by the control system which controls the damper 94 in such a manner as to provide sufficient cooling to maintain a constant temperature in the walls of the cabinet 20.

To speed and make more uniform the reaction of the foam-forming materials 64 and the production of a uniform, lightweight, cellular structure, I prefer to introduce microwave energy, preferably between ten to the seventh power ($10^7$) and ten to the thirteenth power ($10^{13}$) megacycles. For this purpose, I provide two microwave generators 121 and 123 which discharge into the insulation space 58 at the beginning of the introduction of the foam-forming materials. Preferably, this is continued during the first two minutes of supply of the foam-forming materials. The microwave generator 121 is connected through the wave guide 125 to an opening 127 covered by a plastic window 128 in the rear wall 32 of the cabinet. This microwave energy is directed to the insulation space between the vertical wall portions of the inner and outer walls 22 and 24. It is transmitted throughout the greater portion of the insulation space by bouncing from wall to wall and by being reflected by the inner and outer metal walls 22 and 24. The microwave generator 123 is connected by the wave guide 129 to another opening covered by another plastic window behind the plane of the section in the bottom wall 131 of the cabinet 20. This discharges the microwave energy laterally so that it permeates, particularly, the space between the inner and outer rear sheet metal walls. It also permeates the space between the inner and outer bottom walls.

The introduction of the microwave energy during the first two minutes of the supply of foam-forming materials to the insulation space 58 makes the resulting cellular structure more uniform and lighter in weight. As indicated in FIGURE 3, it also speeds the reaction since the point 133 indicating the substantial filling of insulation space occurs about one minute before the point 66. Because of the introduction of the microwave energy, the temperature rises more rapidly as indicated by the dash line B. The rise in pressure along the dash line B up to the substantially filled point indicated by the reference character 135 is at least as low and possibly slightly lower than the rise in pressure of the curved area along the dotted line A up to the filled point 68. The deflection of the wall is also slightly less. The rise in pressure and deflection along the dash line B following the fill point 135 is sharper but substantially less in maximum deflection. As shown, the maximum deflection, when the microwave energy is employed, is about .3 inch while the maximum deflection when no microwave energy is used is about .5 inch.

According to my invention, I also employ the cooling apparatus when the microwave energy is used in connection with the foaming. For example, the thermostatic control 94, 96, 98 may be set to be fully open when the temperature indicated by the reference character 133 is reached. This is approximately 280° F. However, when microwave energy is used, it is preferable to set these controls 94, 96, 98 to be fully open at a somewhat lower temperature, such as 225° F. This reduces the rise in temperature after 225° F. is reached and substantially provides a constant temperature as indicated by the horizontal dash line 134 after the insulation space is substantially fully filled with the foamed material. This cooling substantially minimizes and eliminates the pressure rise and the increase in deflection after the point designated by the reference character 135 in FIGURE 4 so that a substantially horizontal line 136 will follow after this point. Instead of employing a thermostatic control such as illustrated in FIGURE 1, a control may be provided to start the blower 70 when the introduction of microwave energy is stopped after two minutes or a timing device may be provided to start the blower 70 at the end of two and a half or three minutes. This likewise will prevent any substantial rise in temperature and will minimize and substantially eliminate the expansion of the foam-forming materials and the deflection of the walls after the insulation space 58 is substantially filled.

If desired, the thermostatic control may be omitted and the blower 70 may be started at the beginning of the introduction of the foam-forming material and the injection or supplying of the microwave energy. This results in a temperature curve set forth by the unbroken line designated as C. The insulation space is substantially filled when the temperature indicated by the small circle 137 is reached. This cooling arrangement reduces the maximum deflection to about one half the maximum deflection resulting when no cooling is employed. As indicated by the full line C in FIGURE 4, the maximum temperautre is reached about the same time as the cabinet becomes full and thereafter the temperature is slightly reduced. A slight increase (.2 inch) in the maximum deflection of the wall occurs after the substantially filled point 139 is reached as shown in FIGURE 4.

In FIGURES 5 to 9 inclusive, there are illustrated additional forms of control for the cooling apparatus shown in FIGURE 1. The parts illustrated which are similar to those of FIGURE 1, bear the same reference characters. In FIGURE 5, for the thermostat bulb 98 and the bellows 96 and the damper 94, there is substituted the thermostat bulb 220 which rests against the wall 22 and is responsive to its temperature. The bulb 220 controls the expansion of the bellows 222 which at a suitable temperature will close the switch 224 to connect the supply conductor $L_1$ through the conductor 226 and 228 with the sealed motor-compressor unit 88 which is connected through the conductor 230 to the supply condutcor $L_2$. Since the refrigerating system has a relatively slow response, it is desirable that the switch arrangement 220, 222, 224 be set to close at a lower temperature than the temperature at which the damper 94 is fully open in FIGURE 1.

In FIGURE 6, the switch arrangement 220, 222, 224 is employed to close the circuit from the supply conductor $L_1$ through the conductors 232 and 234 to the fan motor 236 which drives the centrifugal fan 70. This motor 236 is connected by the conductor 238 to the supply conductor $L_2$. In this arrangement, the refrigeration system is continuously operated. In FIGURE 6, the switch arrangement 220, 222, 224 may be set to close at a somewhat higher temperature than in the arrangement shown in FIGURE 5. In either case, the switch arrangements should be set to provide maximum cooling when the insulation space 58 is substantially filled with the foam insulating material. For example, the switch 224 in the arrangement of FIGURE 6 may be set to close at the temperature indicated by the line 134 or the point 137 in FIGURE 3.

In FIGURES 7, 8 and 9, various forms of controls are illustrated which are responsive to the deflection of the inner bottom wall of the cabinet. Preferably, these controls are arranged so that the initial deflection of the wall actuates the control mechanism. As shown in FIGURE 7, there is provided a yoke 240 having legs 242 and 244 at its opposite ends engaging two widely separated points near the edges of the inner bottom wall of the cabinet. Supported by the mid portion of the yoke 240 is a movable spring pressed plunger or contactor 246 which through a switch mechanism or transducer 248 and the conductors 250 and 252 controls a damper operating mechanism 254. This operating mechanism 254 through the mechanism 256 operates the damper 94 to fully open position. The damper operating mechanism 254 is supplied with current from the supply conductors $L_1$ and $L_2$ under the control of the switch or transducer 248. In this arrangement any slight expansion of the foam-forming materials causing a deflection of the inner bottom wall surface 22 will operate the contact member 246 to cause the operation of the damper control 254 through the connection 256 to fully open the damper 94. This will provide maximum cooling through the circulating air over the wall surfaces of the cabinet so as to prevent further expansion of the foam-forming materials in the insulation space 58 to prevent further deflection of the wall surfaces.

In FIGURE 8, the switch or transducer 248 will close the circuit from the supply conductor $L_1$ through the conductors 260 and 262 to the sealed motor-compressor unit 88 which is also connected by the conductor 264 to the supply conductor $L_2$. In this arrangement, as soon as there is the slightest amount of deflection of the bottom inner wall surface, the sealed motor-compressor unit will be started to refrigerate the air being circulated around the wall surfaces of the cabinet.

In the form shown in FIGURE 9, as soon as the inner bottom wall surface deflects the slightest amount, the switch or transducer 248 will close the circuit from the supply condutcor $L_2$ through the conductors 266 and 268 to the fan motor 270 which is also connected to the supply conductor $L_1$. In this arrangement, as soon as there is the slightest amount of deflection of the inner bottom wall surface 22, the fan 70 will be operated by the motor 270 to circulate cold air in contact with all the wall surfaces of the refrigerator cabinet to prevent further expansion of the foam material and further deflection of the walls of the cabinet so that no molds will be required.

Thus, in all the forms of the invention, I provide a flow of cooling air sufficient to prevent substantial deflection of the walls of the cabinet during the foaming of the foam-forming materials within the insulation space 58 so that the need for molds to prevent the deflection of the walls of the cabinet during this operation is substantially unnecessary.

While the embodiments of the present invention, as herein disclosed, constitute preferred forms, it is to be understood that other forms might be adopted.

What is claimed is as follows:

1. The method of insulating a cabinet having spaced sheet walls, providing an insulation space therebetween adjoining a storage compartment, said walls capable of bulging outwardly when a pressure is exerted on their interior surfaces, comprising:
   (a) inserting into the insulation space, foam-forming material,
   (b) forming within the insulation space a foam which increases in temperature, expands and exerts an outward pressure on said walls, having a tendency to cause bulging outwardly of said walls, and
   (c) as the insulation space is substantially filled with the foamed material, forceably circulating a cooling fluid in heat transfer relation with the spaced walls, at a rate sufficient to prevent any substantial increase in the temperature of the foam and thereby prevent any substantial bulging of the spaced walls.

2. The method of claim 1 in which the fluid is circulated around the outside of the cabinet and in the storage compartment in heat transfer relation with the spaced walls.

3. The method of claim 1 in which the rate of circulation of the cooling fluid is increased or decreased in proportion to the increase or decrease, respectively, of the temperature of the portion of the spaced walls which are substantially filled with foam.

4. The method of claim 1 in which the rate of increase of the circulation of the cooling fluid is varied in accordance with the outward bulging of the portion of the spaced walls which are substantially filled with foam.

(References on following page)

References Cited by the Examiner

UNITED STATES PATENTS

| | | | |
|---|---|---|---|
| 2,332,674 | 10/1943 | Smith | 264—40 X |
| 2,603,741 | 7/1952 | Seifried et al. | 219—10.55 X |
| 2,653,139 | 9/1953 | Sterling | 260—2.5 |
| 2,738,406 | 3/1956 | Zaleski | 219—10.55 |
| 2,820,987 | 1/1958 | Bunch | 264—40 |
| 2,841,205 | 7/1958 | Bird | 264—47 |
| 2,907,627 | 10/1959 | Cummings | 21—60.5 |
| 2,962,407 | 11/1960 | Aykanian | 264—47 |
| 3,046,177 | 7/1962 | Hankins | 246—257 |
| 3,060,843 | 10/1962 | Moore et al. | |
| 3,047,449 | 7/1963 | Coble | 264—47 |
| 3,099,516 | 7/1963 | Henrickson | 264—48 |
| 3,117,171 | 1/1964 | Voelker | 264—47 |
| 3,122,785 | 3/1964 | Weinbrenner et al. | 264—40 X |
| 3,125,616 | 3/1964 | Cook et al. | |
| 3,174,887 | 3/1965 | Voelker | 264—47 X |

FOREIGN PATENTS 842,267   9/1952   Germany.

OTHER REFERENCES

Chemical Progress (Union Carbide), Volume 8, No. 7, July 1962, "Rigid Foam Polyol Capacity Increased Ten-Fold," pp. 4–5.

Knox, R. E.: "Trouble-Shooting guide for Molding One-Shot Resilient Polyether Foam." Dupont Hylene foam bulletin, Nov. 30, 1960, 12 pp.

Modern Plastics, "Urethane Foam Brings Back the Gas Refrigerator," Volume 38, No. 8, April 1961, pp. 96–98.

ROBERT F. WHITE, *Primary Examiner.*

ALEXANDER H. BRODMERKEL, *Examiner.*

P. E. ANDERSON, *Assistant Examiner.*